Patented Aug. 6, 1929.

1,723,328

UNITED STATES PATENT OFFICE.

ROBERT NEEL BURNETT, OF HOUSTON, TEXAS, ASSIGNOR OF ONE-FOURTH TO A. M. BOWMAN, OF HOUSTON, TEXAS.

COMPOSITION FOR TREATING BELTS AND THE LIKE.

No Drawing.   Application filed April 14, 1928. Serial No. 270,151.

This invention relates to a novel composition.

One object of the invention is to provide a composition of the character described specially designed for the purpose of impregnating pervious belts, ropes and the like, whereby the impregnated article will be rendered impervious to moisture.

Another object of the invention is to provide a novel composition which is itself very durable, and which will render the material it impregnates very durable even under the action of steam; very resistant to the action of gases and acids, and indifferently affected by any working range of temperature, or by any sudden change of temperature.

Another object of the invention is to provide a composition which will render a transmission belt, or a conveyer belt, so pliable that it can not crack, break or tear even when operated through very short bends or over very small pulleys.

Another feature of the invention is to provide a composition which, when applied to a transmission belt, will greatly increase the co-efficient of tractive friction of the belt, and hence enable it to transmit more power without running the belt any tighter, or which will enable the belt to be operated much looser and yet transmit the same amount of power.

Another feature of the invention is to provide a composition which can be applied without heating, and which will, when applied, permeate and saturate the fibers of the belt with a proper fiber lubricant, and which will deposit itself around and between the impregnated fibers of the belt and cling there without deteriorating until the fibers are able to further absorb the composition.

A further feature of the invention is to provide a composition which is preservative in its effect upon the fabric, or the fibers of the belt to which it is applied, and which will, therefore, extend the life of the belt.

A further feature of the invention is to provide a composition of the character described which may be cheaply and easily produced and readily applied.

With the above and other objects in view, this invention relates to a novel composition more specifically hereinafter described.

The essential ingredients of the composition consist of fish oil (commonly called whale oil), castor oil, gum arabic, distilled water and neat's-foot oil, to which deodorants, such as nitro-benzene and banana oil may be added. Excepting for the treatment of tanned leather belts, the amount of neat's-foot oil used may be very little, or it may be eliminated altogether.

The above named ingredients are mixed in substantially the following proportions:

For fabric belts:
Solution of gum arabic _____ 18%
Vegetable castor oil _____ 68%
Fish oil _____ 14%

For leather belts:
Solution of gum arabic _____ 10%
Vegetable castor oil _____ 22%
Fish oil _____ 8%
Neat's-foot oil _____ 60%

The gum arabic should be prepared as an hydrous or aqueous solution by slowly mixing pure water with it until a desired consistency or viscosity is obtained. A desirable viscosity is that which is about equal to the viscosity of the castor oil used in the composition, because then the two ingredients mix and emulsify more readily and with greater stability. The amount of water used is, in any case, very small and it may be varied materially without affecting the efficiency of the resulting composition.

The fish oil performs two highly important functions, one of which is to lubricate the minute fibers of the material and thus delay their destruction by rubbing upon one another. This, it does more effectually than any other oil can do because of its unusual propensity for penetration and saturation of all animal and vegetable fibers, regardless of density or structural compactness. The other important function of the fish oil is to stabilize the emulsification of the gum arabic solution and the castor oil used in this composition.

There is a marked difference in the action of various lots of fish oil in stabilizing this emulsion, and, therefore, it is difficult to specify closely the amount that may be required to properly compound the mixture. The rule should be to use as little fish oil as will effectually stabilize the emulsion, and that amount will usually be between eight per cent and twenty-two per cent of the total mixture.

The manner of mixing the ingredients is the same in both cases and is as follows:

The different oils are first mixed thoroughly apart from the other ingredients.

The solution of gum arabic is placed in a vessel and vigorously agitated either by means of rapid stirring or by whipping, and the mixture of oils is then poured slowly into the same vessel while the agitation continues until a thoroughly uniform admixture is obtained.

The resulting composition is a permanently stable admixture and emulsion which, when sparingly applied, renders the material to which it is applied very pliable and soft; protects it against harmful effects of acids, gases, moisture and abnormal temperatures; increases its ability to transmit power by increasing its co-efficient of friction, and preserves and extends the life of the material.

What I claim is:

1. A composition comprising gum arabic, pure water, castor oil, fish oil and a deodorant.

2. A composition comprising an aqueous solution of gum arabic, castor oil and fish oil.

3. A composition comprising a mixture of approximately 70% of castor oil, and about equal proportions of fish oil and a hydrous solution of gum arabic.

4. A composition for treating belts comprising a mixture of gum arabic, water, fish oil and a vegetable oil.

5. A composition for treating belts comprising a mixture of ingredients in proportions approximately as follows: gum arabic 18%, vegetable castor oil 68%, and fish oil 14%.

In testimony whereof I hereunto affix my signature this 7th day of April, A. D. 1928.

ROBERT NEEL BURNETT.